(12) United States Patent
Mizutani et al.

(10) Patent No.: US 10,101,089 B2
(45) Date of Patent: Oct. 16, 2018

(54) ELECTRIC ARC FURNACE

(71) Applicant: DAIDO STEEL CO., LTD., Nagoya-shi, Aichi (JP)

(72) Inventors: Kota Mizutani, Aichi (JP); Masato Ogawa, Aichi (JP); Kunio Matsuo, Aichi (JP)

(73) Assignee: DAIDO STEEL CO., LTD., Aichi (JP)

( * ) Notice: Subject to any disclaimer, the term of this patent is extended or adjusted under 35 U.S.C. 154(b) by 313 days.

(21) Appl. No.: 14/930,823

(22) Filed: Nov. 3, 2015

(65) Prior Publication Data
US 2016/0123667 A1 May 5, 2016

(30) Foreign Application Priority Data

Nov. 5, 2014 (JP) .................................. 2014-225148
Jul. 24, 2015 (JP) .................................. 2015-146743

(51) Int. Cl.
| | | |
|---|---|---|
| *F27D 1/00* | (2006.01) | |
| *F27D 1/02* | (2006.01) | |
| *F27D 11/08* | (2006.01) | |
| *F27B 3/08* | (2006.01) | |
| *F27B 3/12* | (2006.01) | |
| *F27B 14/08* | (2006.01) | |

(52) U.S. Cl.
CPC .............. *F27D 11/08* (2013.01); *F27B 3/085* (2013.01); *F27B 3/12* (2013.01); *F27B 2014/0825* (2013.01); *F27B 2014/0831* (2013.01)

(58) Field of Classification Search
CPC .. F27B 14/06; F27B 14/12; F27B 2014/0825; F27B 2014/0831; F27B 3/085; F27B 3/12; F27D 11/08; F27D 11/02

USPC .. 373/70, 84, 102, 104, 106, 60, 71, 72, 79, 373/83, 85, 86
See application file for complete search history.

(56) References Cited

U.S. PATENT DOCUMENTS

| | | | |
|---|---|---|---|
| 1,378,972 A | 5/1921 | Moore | |
| 2,686,961 A | 8/1954 | Ellefsen | |
| 2,907,807 A * | 10/1959 | Noesen | ..................... C22B 9/18 373/104 |
| 3,237,930 A | 3/1966 | Hofmann | |
| 3,955,964 A | 5/1976 | MacDonald | |
| 3,980,801 A | 9/1976 | Milasius | |
| 4,110,546 A | 8/1978 | Stenkvist | |
| 4,228,314 A | 10/1980 | Stenkvist | |

(Continued)

FOREIGN PATENT DOCUMENTS

| | | |
|---|---|---|
| CN | 1070302 | 3/1993 |
| CN | 1072459 | 5/1993 |

(Continued)

OTHER PUBLICATIONS

US 5,883,917, 03/1999, Mathur et al. (withdrawn)

(Continued)

*Primary Examiner* — Hung D Nguyen

(74) *Attorney, Agent, or Firm* — Greenblum & Bernstein, P.L.C.

(57) ABSTRACT

The present invention relates to an electric arc furnace, containing a furnace shell, an electrode, a furnace shell moving mechanism that supports the furnace shell so as to be movable on an installation surface, and a first insulation that electrically insulates between the furnace shell and the furnace shell moving mechanism.

4 Claims, 4 Drawing Sheets

(56) References Cited

U.S. PATENT DOCUMENTS

| | | | |
|---|---|---|---|
| 4,638,487 A | | 1/1987 | Tomizawa |
| 4,662,526 A | * | 5/1987 | Schaller ................ B66C 23/16 373/73 |
| 4,679,773 A | | 7/1987 | Wunsche |
| 4,694,465 A | | 9/1987 | Nanjo |
| 4,965,813 A | | 10/1990 | Udo |
| 5,153,894 A | | 10/1992 | Ehle et al. |
| 5,264,020 A | | 11/1993 | Ehle |
| 5,274,663 A | | 12/1993 | Stenkvist |
| 5,471,495 A | | 11/1995 | Berger et al. |
| 5,573,573 A | | 11/1996 | Berger et al. |
| 5,756,957 A | | 5/1998 | Titus et al. |
| 6,125,133 A | | 9/2000 | Mathur et al. |
| 6,274,081 B1 | | 8/2001 | Fuchs |
| 6,377,605 B1 | | 4/2002 | McCaffrey |
| 6,393,043 B1 | | 5/2002 | Fuchs |
| 2002/0110175 A1 | | 8/2002 | Stercho |
| 2013/0336353 A1 | | 12/2013 | Krepel et al. |
| 2016/0003542 A1 | | 1/2016 | Huang et al. |

FOREIGN PATENT DOCUMENTS

| | | |
|---|---|---|
| CN | 1131197 | 9/1996 |
| CN | 1198525 | 11/1998 |
| CN | 1302370 | 7/2001 |
| CN | 103075881 | 5/2013 |
| CN | 103185463 | 7/2013 |
| CN | 103509954 | 1/2014 |
| CN | 203657484 | 6/2014 |
| CN | 103954133 | 7/2014 |
| EP | 2799799 | 11/2014 |
| JP | UM-A-S56-008295 | 6/1954 |
| JP | UM-A-S57-167397 | 4/1956 |
| JP | 60-122886 | 7/1985 |
| JP | 04-217783 | 8/1992 |
| JP | 2014-40965 | 3/2014 |

OTHER PUBLICATIONS

Official Action issued in U.S. Appl. No. 14/930,809 dated Jul. 28, 2017.
Quayle Action issued in U.S. Appl. No. 14/930,793 dated Nov. 16, 2017.
U.S. Appl. No. 14/930,793 to Noriyuki Tomita et al., filed Nov. 3, 2015.
U.S. Appl. No. 14/930,775 to Noriyuki Tomita et al., filed Nov. 3, 2015.
U.S. Appl. No. 14/930,809 to Kota Mizutani et al., filed Nov. 3, 2015.
Official Action in U.S. Appl. No. 14/930,809 dated Jan. 13, 2017.
Office Action issued in U.S.A. Counterpart U.S. Appl. No. 14/930,775, dated Dec. 18, 2017.
Office action dated Apr. 12, 2018 issued in corresponding Taiwanese patent application No. 104136523, and translation.
Office action dated Apr. 12, 2018 issued in corresponding Taiwanese patent application No. 104136524, and translation.
Office Action issued in China counterpart Patent application No. 201510751116.3, dated Jul. 10, 2018, along with English language translation thereof.
Office Action issued in China counterpart Patent application No. 201510751119.7, dated Jul. 11, 2018, along with English language translation thereof.
Office Action issued in China counterpart Patent application No. 201510745545.X, dated Jul. 16, 2018, along with English language translation thereof.
Office Action issued in China counterpart Patent application No. 201510751128.6, dated Jul. 25, 2018, along with English language translation thereof.
Office Action issued in U.S. Appl. No. 14/930,775, dated Jul. 16, 2018.
Notification of Reasons for Refusal drafted on Aug. 10, 2018 and dated Aug. 16, 2018 in the corresponding Japanese patent application No. 2014-225630 and English translation thereof.

* cited by examiner

ELECTRIC ARC FURNACE

FIELD OF THE INVENTION

The present invention relates to an electric arc furnace and, in particular, relates to an electric arc furnace in which metal is melted while moving a furnace shell.

BACKGROUND ART OF THE INVENTION

In an arc furnace as a kind of electric arc furnace for melting metal material, a so-called hot spot and cold spot are formed within an inner space of a furnace shell containing the metal material. The hot spot places close to electrodes and at which the metal material is likely to be melted. The cold spot places distant from the electrodes and at which the metal material is not likely to be melted. In the cold spot, there arise a problem that it takes a long period of time to melt the metal material and thus melting of the metal material proceeds uniformly as a whole. In order to solve this problem, Patent Literature 1 proposes a process in which a furnace shell is rotationally displaced around an axis line extending in an up-down direction with respect to electrodes, thereby exchanging between the cold spot and the hot spot. In such the electric arc furnace, thermal nonuniformity within the furnace can be eliminated and an amount of wasteful power consumption can be reduced by rotationally displacing the furnace shell, without consuming power for a pump at an extra water-cooled part like in a shaft furnace and without additionally supplying burner combustion energy or the like for a composition appropriating processing of exhaust gas.

Patent Literature 1: JP-A-2014-40965

SUMMARY OF THE INVENTION

In the arc furnace, a great current flows in the electrode inserted into the furnace shell in order to melt the metal material. Due to the current flowing in the electrode, a current may also flow in the furnace shell. In particular, in a case where the current flowing in the electrode is alternate current, an induction current constantly flows in a surface of the furnace shell. In order to perform rotation displacement of the furnace shell, a furnace shell moving mechanism having a movable part such as a bearing is employed. If a leak current flowing through the metal material within the furnace shell or the induction current flowing through the surface of the furnace shell flows in this kind of movable part, such the current may damage the movable part and impair a function of the movable part. For example, in a state that an electrode are inserted into the furnace shell and supplied with current, if a leak current flowing through the metal material within the furnace shell or an induction current generated in the furnace shell flows in a member such as the bearing of the furnace shell moving mechanism and generates spark, even when the furnace shell moving mechanism is in a static state, constitutional members of the furnace shell moving mechanism may be damaged, and hence succeeding smooth movement of the furnace shell may be interfered.

Therefore, an object of the present invention is to provide an electric arc furnace having a furnace shell being moved, which can prevent current from flowing in a furnace shell moving mechanism for moving the furnace shell.

In order to solve the above problem, the present invention provides an electric arc furnace containing:
a furnace shell;
an electrode;
a furnace shell moving mechanism that supports the furnace shell so as to be movable on an installation surface; and
a first insulation member that electrically insulates between the furnace shell and the furnace shell moving mechanism.

Here, it is preferable that the furnace shell moving mechanism includes a first part that is fixed with respect to the installation surface and a second part that is fixed to the furnace shell and is movable with respect to the first part, and that the first part is electrically connected to the second part.

In this case, it is preferable that the electric arc furnace further contains a connecting wire that electrically connects between the first part and the second part of the furnace shell moving mechanism, in which the connecting wire has a length capable of following an entire movable range of the second part.

The furnace shell and the furnace shell moving mechanism are preferably independently grounded.

In addition, it is preferable that the electric arc furnace further contains:
a furnace roof that covers an opening of the furnace shell;
a furnace roof moving mechanism that moves the furnace roof with respect to the furnace shell; and
a second insulation member that electrically insulates between the furnace roof moving mechanism and the furnace shell. In this case, the furnace shell and the furnace roof moving mechanism are preferably independently grounded.

In the electric arc furnace according to the present invention, an insulation member (first insulation member) is provided between the furnace shell and the furnace shell moving mechanism. Therefore, even in a case where current flows in the furnace shell due to current flowing in an electrode, the current flowing in the furnace shell is prevented from flowing in the furnace shell moving mechanism from the furnace shell. As a result, the furnace shell moving mechanism is prevented from being damaged by the current.

Here, in the case where the furnace shell moving mechanism includes a first part that is fixed with respect to the installation surface and a second part that is fixed to the furnace shell and is movable with respect to the first part and the first part is electrically connected to the second part, the first part and the second part become equipotential. Thus, even if current flows in the furnace shell moving mechanism due to dielectric breakdown or the like of the first insulation member which electrically insulates between the furnace shell and the furnace shell moving mechanism, such a phenomenon unlikely occurs that current flows over a wide area within the furnace shell moving mechanism. As a result, the furnace shell moving mechanism can be prevented with high accuracy from being damaged seriously.

In this case, if a connecting wire for electrically connecting between the first part and the second part of the furnace shell moving mechanism is provided and has a length capable of following the entire movable range of the second part, the connecting wire is prevented from being damaged and applied with an excessive force even when the second part is moved with respect to the first part.

Further, in the case where the furnace shell and the furnace shell moving mechanism are independently grounded, the current flowing in the furnace shell can be more firmly prevented from flowing in the furnace shell moving mechanism.

Furthermore, in the case where the electric arc furnace further includes a furnace roof that covers the opening of the furnace shell, a furnace roof moving mechanism that moves the furnace roof with respect to the furnace shell, and an second insulation member that electrically insulates between the furnace roof moving mechanism and the furnace shell, the current flowing in the furnace shell can also be prevented from flowing in the furnace roof moving mechanism. Accordingly, a member constituting the furnace roof moving mechanism can also be prevented from being damaged due to the current.

In this case, if the furnace shell and the furnace roof moving mechanism are independently grounded, the current flowing in the furnace shell can be more firmly prevented from flowing in the furnace roof moving mechanism.

BRIEF DESCRIPTION OF THE DRAWINGS

FIG. 4A illustrates a state seen from an upper side of a furnace shell moving mechanism; FIG. 4B is a cross-sectional view cut along A-A in FIG. 4A; and in FIG. 4A, a broken line illustrates a state of the bearing connecting wire at a time of rotating a furnace shell by 50°.

DETAILED DESCRIPTION OF THE INVENTION

Figure 1:
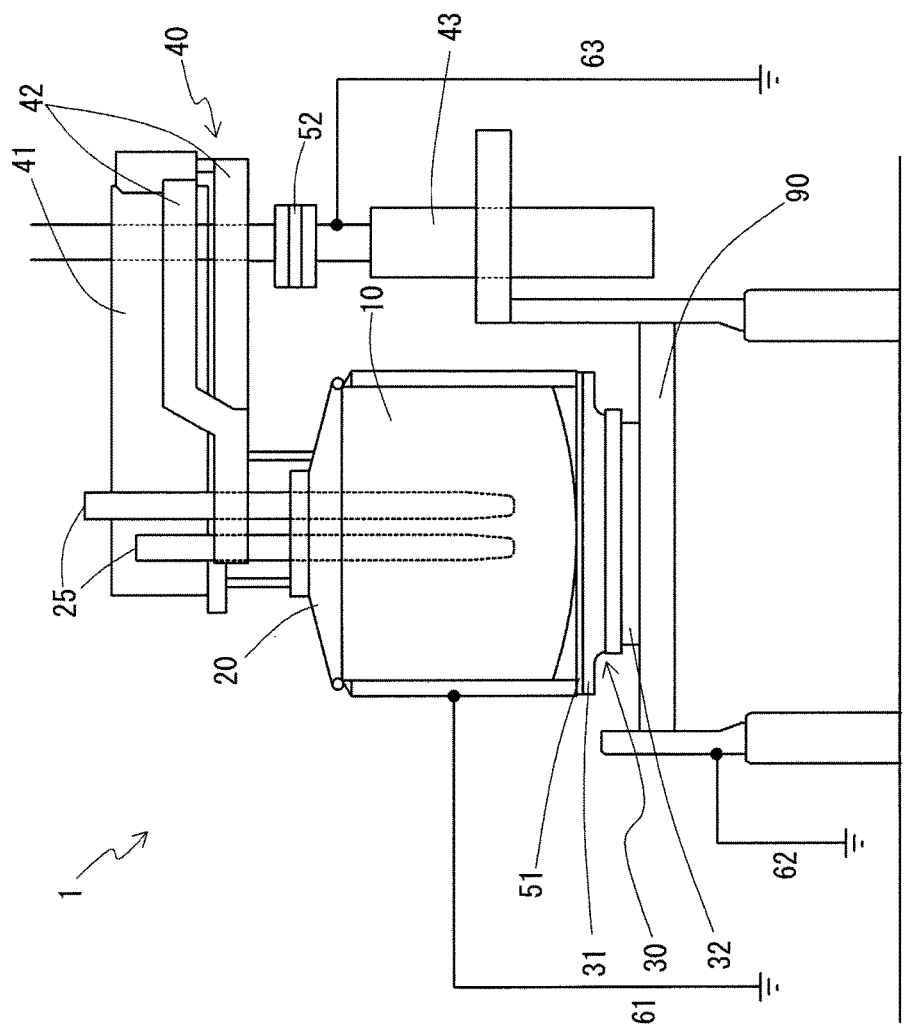
FIG. 1 is a side view illustrating an electric arc furnace according to an embodiment of the present invention.

Explanation will be made with reference to the drawings as to an electric arc furnace according to an embodiment of the present invention.

(Configuration of Electric Arc Furnace)

FIG. 1 to FIG. 4B illustrate an electric arc furnace 1 according to the embodiment of the present invention. The electric arc furnace 1 is installed on a platform 90. The electric arc furnace 1 has, as a main body part, an electric arc furnace (arc furnace) similar to that described in Patent Literature 1, and includes a furnace shell 10, a furnace roof 20 and electrodes 25. In addition, the electric arc furnace 1 includes a furnace shell moving mechanism 30 and a furnace roof holding unit 40 having a furnace roof moving mechanism 43. Further, the electric arc furnace 1 also includes a furnace shell insulation member (first insulation member) 51 and a furnace roof insulation member (second insulation member) 52 as insulation members, and a furnace shell ground wire 61, a furnace shell moving mechanism ground wire 62 and a furnace roof moving mechanism ground wire 63.

The furnace shell 10 is formed as an almost circular cylindrical bottomed vessel having an opening at its top part. The furnace shell 10 is formed by a material provided with a steel shell at an outer side of refractory made of a metal oxide.

The furnace roof 20 is formed as an almost disc-shape and is capable of closing the opening of the furnace shell 10. The furnace roof 20 is held by the furnace roof holding unit 40 and performs an up/down movement and a rotation movement above the furnace shell 10, thereby moving between a state of closing the opening of the furnace shell 10 and a state of opening the opening. Although the furnace roof 20 is also formed by a material similar to that of the furnace shell 10, insulator is exposed at respective portions of the furnace roof near parts where the electrodes 25 described later penetrate the furnace roof. Thus, electric insulation is kept between the furnace roof and the electrodes 25.

In the present embodiment, three electrodes 25 (only two electrodes are illustrated in FIG. 1) penetrate the furnace roof 20 from an upper side toward an inner space of the furnace shell 10. The three electrodes 25 are arranged to form an almost equilateral triangle around a center axis of the furnace shell 10. When a metal material such as iron scrap material is contained in the furnace shell 10 and the three electrodes 25 are supplied with current such as three-phase alternate current to perform discharge, the metal material can be molten. The electrodes 25 are electrically insulated from each of the furnace shell 10 and the furnace roof 20.

Figure 2:
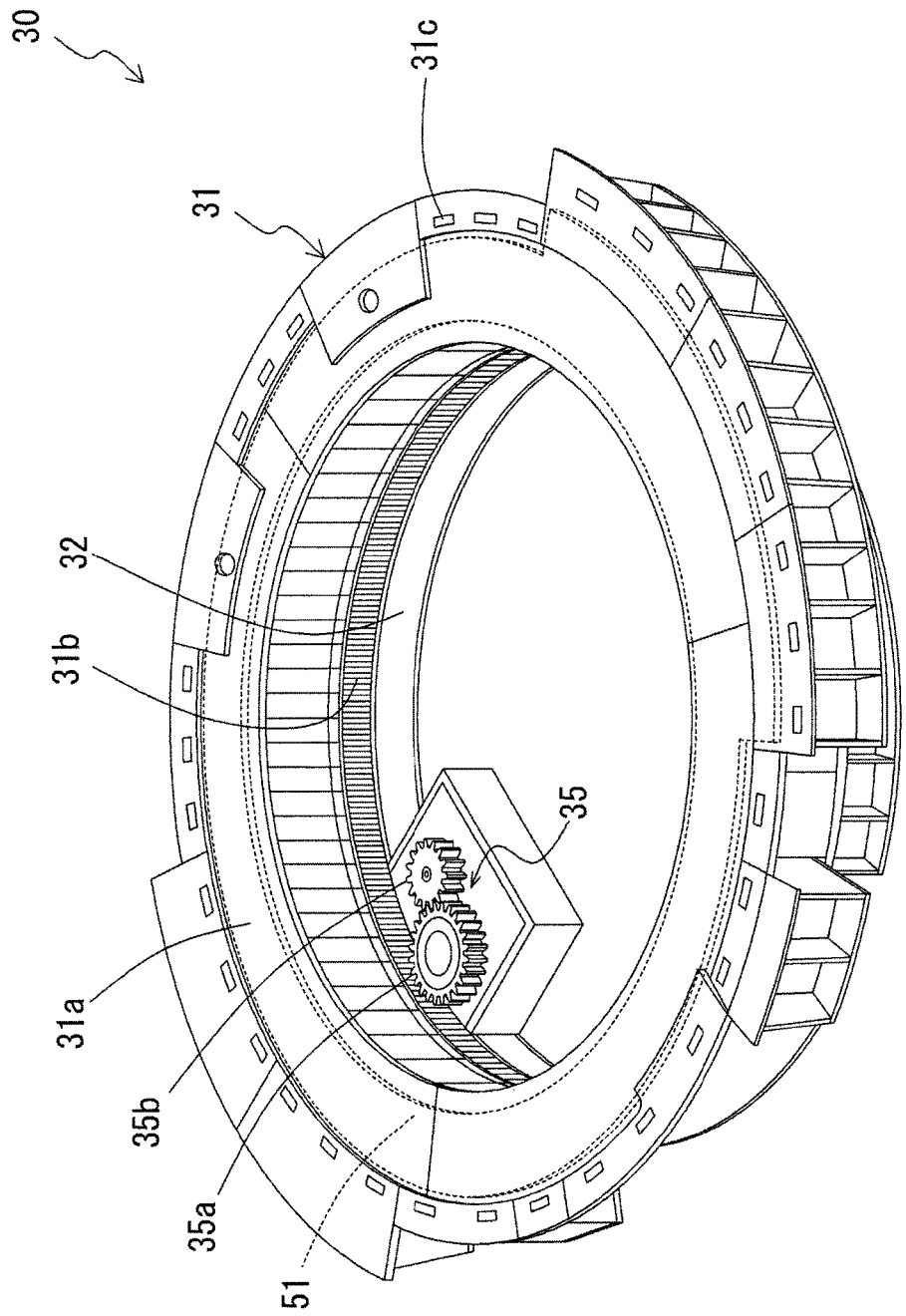
FIG. 2 is a perspective view illustrating a furnace shell moving mechanism and a furnace shell insulation member, in which the furnace shell insulation member is illustrated by a dotted line in a perspective manner.

The furnace shell 10 is supported by a platform (installation surface) 90 via the furnace shell moving mechanism 30. As illustrated in FIG. 2, the furnace shell moving mechanism 30 includes a support frame 31 which is made of a metal and has top and bottom surfaces each having an almost annular shape. The furnace shell 10 is placed on an upper surface 31a as the top surface of the support frame 31 via a furnace shell insulation member 51 of an almost annular-plate shape. A plurality of concave portions 31c is provided in the upper surface 31a of the support frame 31. The furnace shell 10 is fixed on the support frame 31 due to the engagement of convex portions (not illustrated) formed at the furnace shell 10 with the respective concave portions 31c as well as own weight of the furnace shell 10. The furnace shell insulation member 51 electrically insulates between the furnace shell 10 and the support frame 31. A gear member 31b is formed along an inner circumferential surface of the support frame 31. An insulation resin is filled between a bottom portion of the furnace shell 10 and the support frame 31 in a manner of burying the furnace shell insulation member 51 therebetween. Accordingly, respective gaps formed among the bottom portion of the furnace shell 10, the furnace shell insulation member 51 and the support frame 31 are filled by the insulation resin.

Figure 3:
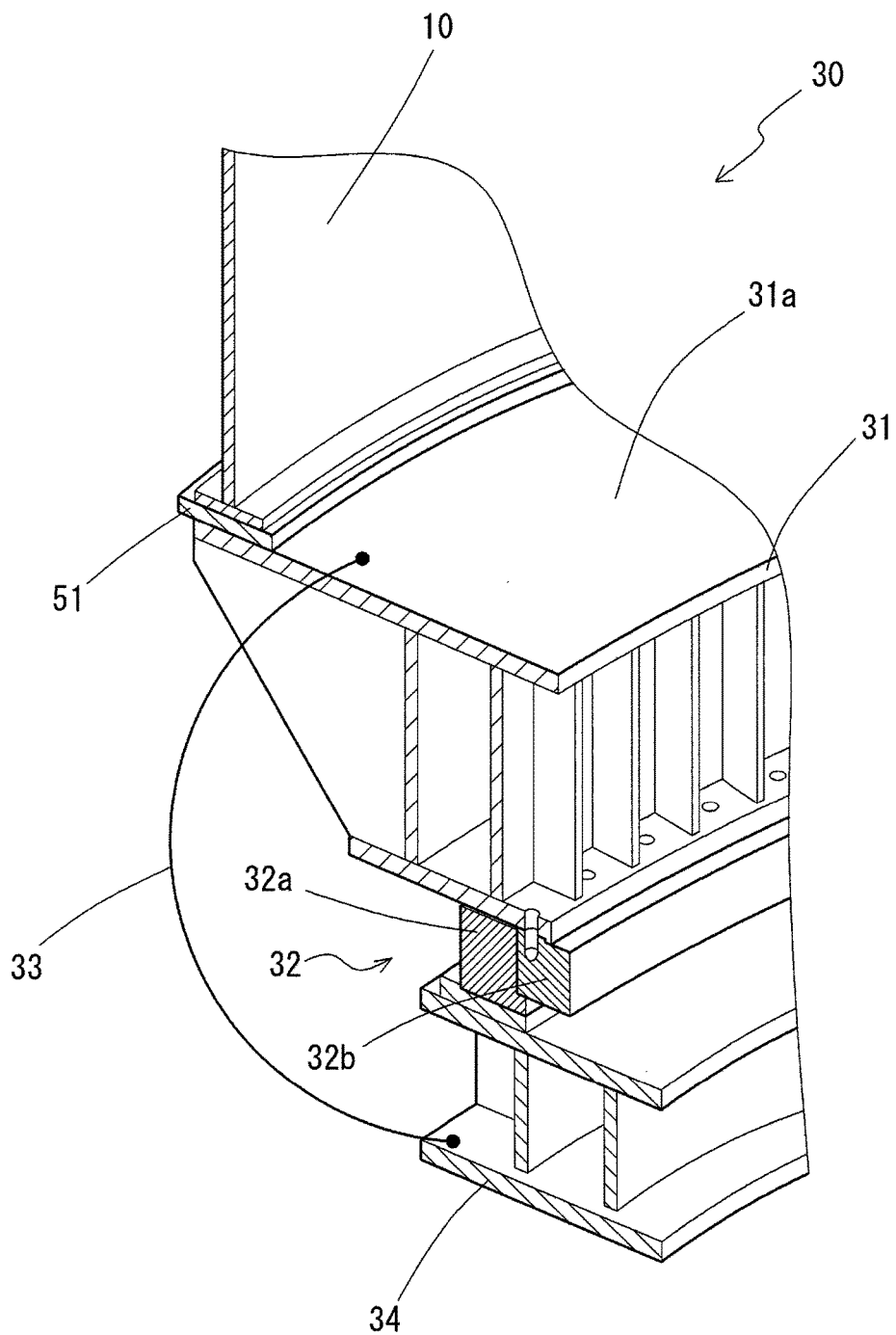
FIG. 3 is an enlarged cross-sectional view of a furnace shell moving mechanism.

The support frame 31 is supported by a bearing 32. FIG. 3 is a cross-sectional view illustrating a part of the furnace shell moving mechanism in the vicinity of the bearing 32. The bearing 32 is attached to an attachment base 34 made of metal fixed on the platform 90. The bearing 32 has configuration of a known swing bearing, and includes an outer wheel (first part) 32a and an inner wheel (second part) 32b each made of a metal, and rolling elements (not illustrated) arranged between the outer wheel 32a and the inner wheel 32b. The inner wheel 32b is smoothly swingable with respect to the outer wheel 32a. The outer wheel 32a is fixed to the attachment base 34 and the inner wheel 32b is fixed to the gear member 31b of the support fame 31. A bearing connecting wire 33 electrically connects between the support frame 31 and the attachment base 34. The bearing connecting wire 33 has a sufficient length capable of following an entire swingable or rotatable range of the support frame 31. Since the outer wheel 32a of the bearing 32 is made in contact with the attachment base 34 and the inner wheel 32b is made in contact with the support frame 31, the outer wheel 32a and the inner wheel 32b are electrically connected to each other by the bearing connecting wire 33.

A gear part 35 having two gears (first gear 35a and second gear 35b) meshed to each other is provided at the inner periphery side of the support frame 31. Although FIG. 2 shows the only one gear part 35, another gear part similar to the gear part 35 is provided at an opposite position of the inner periphery. The first gear 35a constituting the gear part 35 meshes with the gear member 31b provided at the inner circumferential surface of the support frame 31. A rotation shaft of the second gear 35b meshed with the first gear 35a is coupled to an output shaft of a hydraulic motor (not illustrated).

The support frame 31 can be made to swing on the bearing 32 by driving the hydraulic motor of the gear part 35. As a result, the furnace shell 10 is made to rotate (swing) on the platform 90. When the furnace shell 10 rotates, respective positions of the electrodes 25 along a plane of the platform 90 do not change. Thus, relative arrangement between the furnace shell 10 and the electrodes 25 changes according to the rotation of the furnace shell 10. A stopper mechanism (not illustrated) for holding the support frame 31 in a state where the rotation of the support frame 31 is stopped may be suitably provided at the inner peripheral side of the support frame 31.

The furnace roof holding unit 40 is provided at the common platform 90 on which the furnace shell 10 is installed via the furnace shell moving mechanism 30. The furnace roof holding unit 40 supports the furnace roof 20 by a furnace roof support part 41 and performs an up/down movement and a rotation movement of the furnace roof 20. The furnace roof holding unit 40 also has a function of holding and performing an up/down movement of the electrodes 25 by electrode support parts 42. Therefore, the furnace roof holding unit 40 can adjust an up/down position of the electrodes 25 depending on a melting state or the like of the metal material within the furnace shell 10. The up/down and rotation movements of the furnace roof 20 and the up/down movement of the electrodes 25 are driven by the furnace roof moving mechanism 43 provided with a bearing and a hydraulic cylinder. The furnace roof support part 41 and the electrode support part 42 are electrically insulated to each other. The furnace roof insulation member 52 is provided between the furnace roof support part 41 and the furnace roof moving mechanism 43. Thus, the furnace roof moving mechanism 43 is electrically insulated from the furnace roof 20 and the furnace roof support part 41. The furnace roof moving mechanism 43 side portion of the furnace roof holding unit partitioned by the furnace roof insulation member 52 is grounded by the furnace roof moving mechanism ground wire 63.

The platform 90, on which the electric arc furnace 1 is installed, is a stand made of a metal. The platform 90 is grounded by the furnace shell moving mechanism ground wire 62. The attachment base 34 of the furnace shell moving mechanism 30 is fixed on the platform 90 in a contact manner. Thus, the bearing 32 of the furnace shell moving mechanism 30 is grounded by the furnace shell moving mechanism ground wire 62 at the outer wheel 32a portion. The platform 90 may be provided with a tilting mechanism for tilting constitutional members of the electric arc furnace 1 such as the furnace shell 10, to thereby facilitate a tapping of molten metal and a discharging of slag from the furnace shell 10.

Although the present electric arc furnace 1 is provided with the three ground wires, that is, the furnace shell ground wire 61, the furnace shell moving mechanism ground wire 62 and the furnace roof moving mechanism ground wire 63, they are provided as independent ground wires. For example, these three ground wires 61 to 63 are connected to three ground electrodes buried into the ground at separate positions, respectively.

(Characteristics of Electric Arc Furnace)

As described above, in the electric arc furnace 1 according to the present embodiment, a positional relation between the furnace shell 10 and the electrodes 25 can be changed by rotating the furnace shell 10 with respect to the electrodes 25 by the furnace shell moving mechanism 30. By changing the positional relation, uniformity of heating and melting of the metal material within the furnace shell 10 can be enhanced. That is, as the electrodes 25 are arranged in a triangle shape around the center axis of the furnace shell 10 having an almost cylindrical shape, a hot spot, which is close to the electrodes 25 and likely to be a high temperature, and a cold spot, which is distant from the electrodes 25 and unlikely to be a high temperature, are inevitably generated within the furnace shell 10. However, by rotating the furnace shell 10 to change the positional relation between the furnace shell 10 and the electrodes 25 during the melting process of the metal material, respective positions of the hot spot and the cold spot can be also changed suitably, whereby the uniformity of heating and melting of the metal material can be attained. In terms of necessarily and sufficiently changing the respective positions of the hot spot and the cold spot, a rotatable angle of the furnace shell 10 is preferably in a range of substantially from 50° to 60° in the case where the number of electrodes is three.

In a case of performing an arc discharge, alternate current of several ten kA order flows to the electrodes 25 inserted into the furnace shell 10. This current may flow in the furnace shell moving mechanism 30 or the furnace roof moving mechanism 43 as a leak current via the metal material within the furnace shell 10, the furnace shell 10, the furnace roof 20, and the like. Further, an induction current in a range of from several amperes to several hundred amperes may flow in the steel shell at the surface of the furnace shell 10. If such the leak current or the induction current flows from the furnace shell 10 into a movable part such as the bearing of the furnace shell moving mechanism 30 or the furnace roof moving mechanism 43, a spark may be generated at the movable part even when the furnace shell moving mechanism 30 or the furnace roof moving mechanism 43 is in a static state. Thus, smooth movement of the movable part may be interfered, and further irreversible damage such as breakage of material constituting the movable part may be caused.

However, in the electric arc furnace 1 according to the present embodiment, the furnace shell insulation member 51 is provided between the furnace shell 10 and the furnace shell moving mechanism 30, thereby electrically insulating between the furnace shell 10 and the furnace shell moving mechanism 30. Further, in the furnace roof holding unit 40, the furnace roof insulation member 52 is provided between the furnace roof support part 41 and the furnace roof moving mechanism 43. Therefore, also the furnace roof moving mechanism 43 is electrically insulated from each of the furnace roof 20 and the furnace shell 10 which contacts at its steel shell with the furnace roof 20 in a closed state of the furnace roof 20. According to this arrangement, if the induction current or the leak current flows in the furnace shell 10, these current is prevented from flowing the furnace shell moving mechanism 30 and the furnace roof moving mechanism 43. Insulation material constituting the furnace shell insulation member 51 and the furnace roof insulation member 52 may be, for example, JIS-H type insulator having a high heat resistance such as a laminate (silicon laminate material) formed by silicon resin and glass.

In the electric arc furnace 1, further, the respective constituent elements are independently grounded. That is, the furnace shell 10 is grounded by the furnace shell ground wire 61, the furnace shell moving mechanism 30 is grounded by the furnace shell moving mechanism ground wire 62 via the platform 90, and the furnace roof moving mechanism 43 is grounded by the furnace roof moving mechanism ground wire 63. Therefore, even if dielectric breakdown occurs in the furnace shell insulation member 51 or the furnace roof insulation member 52 due to, for example, a high voltage applied to both ends thereof, the leak current or the induction current flowing in the furnace shell 10 flows to earth potential via the furnace shell ground wire 61 and hence unlikely flows in the furnace shell moving mechanism 30 and the furnace roof moving mechanism 43.

In the electric arc furnace 1, the bearing connecting wire 33 electrically connects between the outer wheel 32a and the inner wheel 32b of the bearing 32 of the furnace shell moving mechanism 30. Therefore, the outer wheel 32a and the inner wheel 32b are kept to be equipotential. Further, not only the outer wheel 32a is grounded by the furnace shell moving mechanism ground wire 62 via the platform 90 and the attachment base 34 but also the inner wheel 32b is grounded. As a result, current is prevented from flowing between the outer wheel 32a and the inner wheel 32b. Accordingly, even if the leak current or the induction current flowing in the furnace shell 10 also flows in one of the outer wheel 32a and the inner wheel 32b, these current is prevented from flowing in the other of these wheels and generating spark in a wide area of the bearing 32.

Figure 4A:
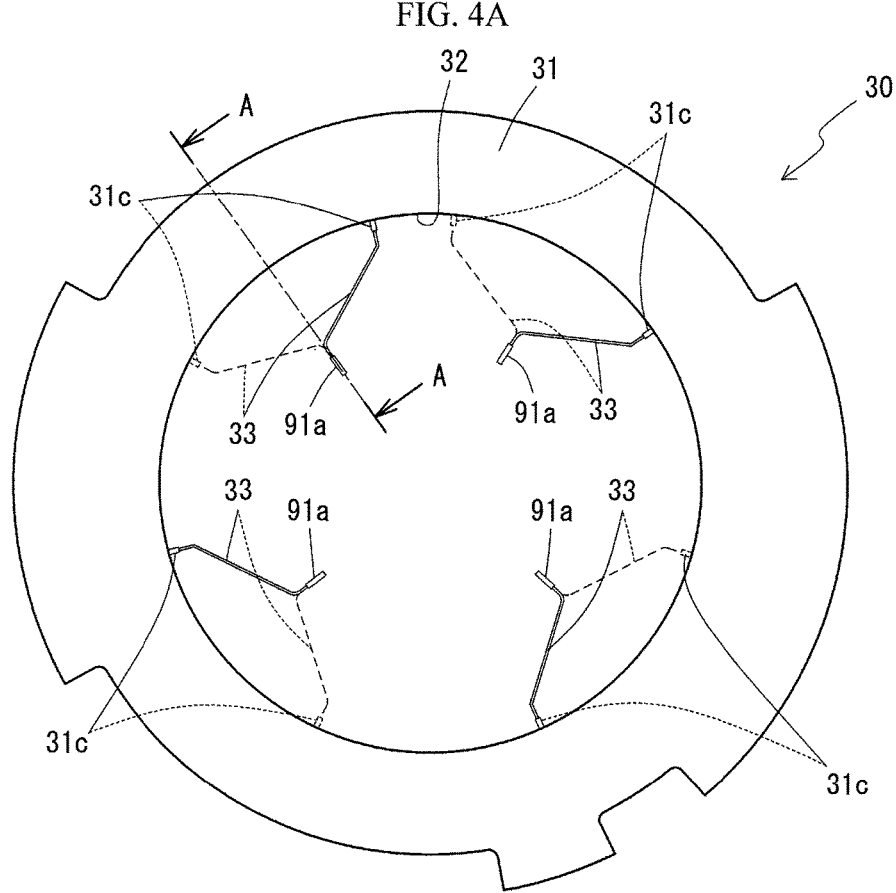
FIG. 4A and FIG. 4B are diagrams illustrating a specific example of an attachment method of a bearing connecting wire.
Figure 4B:
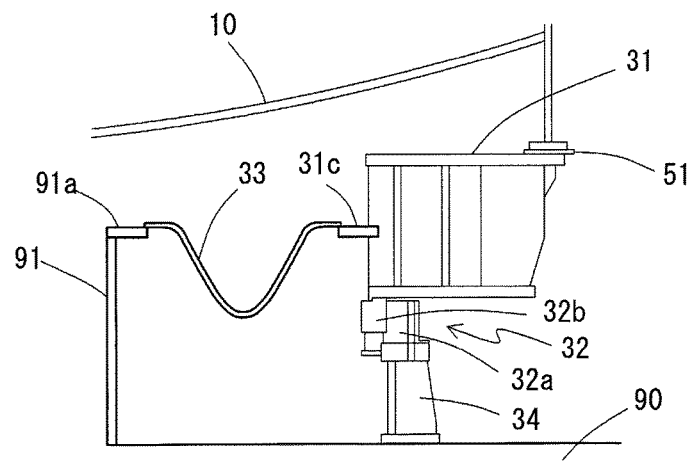

The bearing connecting wire 33 is simply illustrated as a wiring connecting between the support frame 31 and the attachment base 34 in FIG. 3. However, a concrete attachment method of the bearing connecting wire 33 may be any one so long as the outer wheel 32a and the inner wheel 32b of the bearing 32 are electrically connected to each other. An example of such the attachment method is illustrated in FIG. 4A and FIG. 4B. In this example, brackets 31c made conductive with a main body of the support frame 31 are each provided at an almost center portion of the support frame 31 in a height direction. Connection rods 91 made conductive with a main body of the platform 90 stand on the platform 90, and respective bracket 91a is provided at an upper end of the corresponding connection rod 91 so as to locate at substantially the same height as the corresponding frame-side brackets 31c. Each of the connection rods 91 is provided at a substantially center angular position of a movable range of the inner wheel 32b of the bearing 32. One end of each of bearing connecting wires 33 is connected to the corresponding support frame-side bracket 31c, and the other end thereof is connected to the corresponding connection-rod side bracket 91a. Each of the bearing connecting wires 33 has a sufficient length capable of following the entire movable range of the inner wheel 32b of the bearing 32. The length of each of the bearing connecting wires 33 and the positions of the corresponding two brackets 31c and 91a are set in a manner that the each bearing connecting wire 33 locates above an obstacle (not illustrated) such as a necessary unit attached to a driving unit provided at the platform 90 for driving the bearing 32, in the entire movable range of the inner wheel 32b.

When the bearing connecting wire 33 is connected by utilizing the corresponding brackets 31c and 91a, conductivity between the outer wheel 32a and the inner wheel 32b of the bearing 32 can be ensured with high reliability.

Further, when each of the bearing connecting wires 33 is made to have the length capable of following the entire rotatable range of the inner wheel 32b, the each bearing connecting wire 33 can be prevented from being damaged or applied with an excessive external force over the entire rotatable range of the inner wheel 32b, as illustrated by steady and dotted lines in FIG. 4A. In particular, as illustrated in FIG. 4B, if the length of each of the bearing connecting wires 33 is set slightly longer so that the each bearing connecting wire can maintain a bent state without being strained over the entire rotatable range of the inner wheel 32b, the each bearing connecting wire 33 can be effectively prevented from being damaged or applied with an excessive external force.

Further, when each of the bearing connecting wires 33 is arranged above the plane of the platform 90 and also above the obstacle (not illustrated) such as the necessary unit attached to the driving unit provided at the platform 90 for driving the bearing 32, the each bearing connecting wire 33 can avoid interfering with the obstacle when the inner wheel 32b of the bearing 32 rotates. In a case where a member acting as the obstacle with respect to the bearing connecting wire 33 is provided in an area above the platform 90 where the bearing connecting wire 33 passes accompanying with the rotation of the inner wheel 32b, when the bearing connecting wire 33 is not arranged to grovel along the plane of the platform 90 but arranged above the plane of the platform 90, preferably, above the obstacle, the bearing connecting wire 33 can avoid interfering with the obstacle. Although the bearing connecting wire 33 preferably has the length capable of maintaining the bent state as described above, the length is desirably set within such a degree that the bent portion does not contact the obstacle. In the case that each of the connection rods 91 is provided at the substantially center angular position of the movable range of the inner wheel 32b, the bent state of the corresponding bearing connecting wire 33 can be easily ensured over the entire movable range of the inner wheel 32b without excessively elongating the corresponding bearing connecting wire 33.

As described above, although the embodiment according to the present invention are explained in detail, the present invention is not limited to the above-described embodiment and may be changed and modified in various manners within a range not departing from the gist of the present invention. For example, the movement of the furnace shell is not limited to the rotation (swing) around the center axis of the furnace shell but may be any movement on the platform. Further, the furnace shell moving mechanism is not limited to one using the bearing but may be one using a roller, for example.

The present application is based on the Japanese patent applications No. 2014-225148 filed on Nov. 5, 2014 and No. 2015-146743 filed on Jul. 24, 2015, which contents are incorporated herein by reference.

DESCRIPTION OF REFERENCE NUMERALS 1 electric arc furnace
10 furnace shell
20 furnace roof
25 electrode
30 furnace shell moving mechanism
31 support frame
31c bracket
32 bearing
32a outer wheel 32b inner wheel
33 bearing connecting wire
34 attachment base
35 gear part
40 furnace roof holding unit
41 furnace roof support part
42 electrode support part
43 furnace roof moving mechanism
51 furnace shell insulation member (first insulation member)
52 furnace roof insulation member (second insulation member)
61 furnace shell ground wire
62 furnace shell moving mechanism ground wire
63 furnace roof moving mechanism ground wire
90 platform (installation surface)
91 connection rod
91a bracket

What is claimed is:

1. An electric arc furnace, comprising:
   a furnace shell;
   an electrode;
   a furnace shell moving mechanism that supports the furnace shell so as to be movable on an installation surface, the furnace shell moving mechanism comprising:
      a first part being fixed with respect to the installation surface;
      a second part being fixed to the furnace shell and being movable with respect to the first part; and
      the first part being electrically connected to the second part;
   a first insulation that electrically insulates between the furnace shell and the furnace shell moving mechanism; and
   a connecting wire that electrically connects between the first part and the second part of the furnace shell moving mechanism;
   the connecting wire having a length capable of following an entire movable range of the second part.

2. The electric arc furnace according to claim 1, wherein:
   the furnace shell and the furnace shell moving mechanism are independently grounded.

3. The electric arc furnace according to claim 1, further comprising:
   a furnace roof that covers an opening of the furnace shell;
   a furnace roof moving mechanism that moves the furnace roof with respect to the furnace shell; and
   a second insulation that electrically insulates between the furnace roof moving mechanism and the furnace shell.

4. The electric arc furnace according to claim 3, wherein:
   the furnace shell and the furnace roof moving mechanism are independently grounded.

* * * * *